United States Patent
Fitzmaurice et al.

(10) Patent No.: US 7,898,529 B2
(45) Date of Patent: Mar. 1, 2011

(54) USER INTERFACE HAVING A PLACEMENT AND LAYOUT SUITABLE FOR PEN-BASED COMPUTERS

(75) Inventors: George Fitzmaurice, Toronto (CA); Gordon Kurtenbach, Toronto (CA)

(73) Assignee: Autodesk, Inc., San Rafael, CA (US)

(*) Notice: Subject to any disclaimer, the term of this patent is extended or adjusted under 35 U.S.C. 154(b) by 484 days.

(21) Appl. No.: 10/748,686

(22) Filed: Dec. 31, 2003

(65) Prior Publication Data

US 2004/0212617 A1    Oct. 28, 2004

Related U.S. Application Data

(60) Provisional application No. 60/438,499, filed on Jan. 8, 2003.

(51) Int. Cl.
*G06F 3/041* (2006.01)
(52) U.S. Cl. .................. 345/173; 715/810; 715/841
(58) Field of Classification Search ......... 345/156–184; 715/700, 810, 834, 835, 841
See application file for complete search history.

(56) References Cited

U.S. PATENT DOCUMENTS

| | | | | |
|---|---|---|---|---|
| 5,559,944 A | * | 9/1996 | Ono | 715/841 |
| 5,689,667 A | * | 11/1997 | Kurtenbach | 715/810 |
| 5,731,801 A | * | 3/1998 | Fukuzaki | 715/842 |
| 5,808,610 A | | 9/1998 | Benson et al. | |
| 5,809,498 A | | 9/1998 | Lopresti et al. | |
| 5,821,926 A | | 10/1998 | Arita | |
| 5,828,360 A | * | 10/1998 | Anderson et al. | 715/834 |
| 5,926,178 A | | 7/1999 | Kurtenbach | |
| 5,933,143 A | | 8/1999 | Kobayashi | |
| 6,005,549 A | | 12/1999 | Forest | |
| 6,011,542 A | * | 1/2000 | Durrani et al. | 345/156 |
| 6,031,529 A | | 2/2000 | Migos et al. | |
| 6,094,197 A | | 7/2000 | Buxton et al. | |
| 6,281,420 B1 | | 8/2001 | Suzuki et al. | |
| 6,317,142 B1 | | 11/2001 | Decoste et al. | |

(Continued)

OTHER PUBLICATIONS

Adobe Photoshop—Product Overview, http://www.adobe.com/products/photoshop/overview.htm.

(Continued)

*Primary Examiner*—Stephen G Sherman
(74) *Attorney, Agent, or Firm*—Staas & Halsey LLP

(57) ABSTRACT

The present invention is a system that positions an interface for a pen-based computer at an end of a natural user motion arc, such as an arc a hand travels when an elbow is pivoted. Positioning of the interface in a lower corner of a display or window (left corner for a right-handed person and right corner for a left-handed person) allows easy approach when the user is working in the center of the display, such as when drawing on the pen-based computer display. An arc or curved interface improves approach zones and reduces unintended selections of controls or buttons within the interface. The arc allows the natural motion to be extended by wrist or finger motions to access all the controls in the corner command interface. Controls on the arc are placed to allow any underlying pop-up menus to be completely accessible when an activated. Overflow menu items of activated controls of the interface are located in conformity to the natural arc.

31 Claims, 20 Drawing Sheets

U.S. PATENT DOCUMENTS

| | | | |
|---|---|---|---|
| 6,337,698 B1 * | 1/2002 | Keely et al. | 715/823 |
| 6,448,987 B1 * | 9/2002 | Easty et al. | 715/834 |
| 6,606,105 B1 | 8/2003 | Quartetti | |
| 6,760,049 B1 | 7/2004 | Todd | |
| 6,819,990 B2 | 11/2004 | Ichinose | |
| 6,883,143 B2 * | 4/2005 | Driskell | 715/763 |
| 6,918,091 B2 * | 7/2005 | Leavitt et al. | 715/765 |
| 7,058,902 B2 * | 6/2006 | Iwema et al. | 715/810 |
| 7,062,497 B2 | 6/2006 | Hamburg et al. | |
| 7,146,005 B1 * | 12/2006 | Anft et al. | 379/433.06 |
| 2002/0054175 A1 | 5/2002 | Miettinen et al. | |
| 2002/0097277 A1 * | 7/2002 | Pitroda | 345/854 |
| 2002/0122072 A1 * | 9/2002 | Selker | 345/834 |
| 2002/0122158 A1 * | 9/2002 | Miyashita et al. | 353/30 |
| 2002/0171690 A1 | 11/2002 | Fox et al. | |
| 2003/0020687 A1 * | 1/2003 | Sowden et al. | 345/157 |
| 2003/0048309 A1 * | 3/2003 | Tambata et al. | 345/810 |
| 2004/0093565 A1 | 5/2004 | Bernstein et al. | |
| 2004/0119763 A1 | 6/2004 | Mizobuchi et al. | |
| 2004/0125153 A1 | 7/2004 | Tosey | |
| 2004/0189724 A1 | 9/2004 | Golibrodski et al. | |
| 2006/0136840 A1 | 6/2006 | Keely et al. | |

OTHER PUBLICATIONS

Jasc Software—Introduction to Layers, http://www.jasc.com/tutorials/layers.asp.

Kurtenbach, G. and Buxton, W. 1993. The limits of expert performance using hierarchic marking menus. In Proceedings of the SIGCHI Conference on Human Factors in Computing Systems (Amsterdam, The Netherlands, Apr. 24-29, 1993). CHI '93. ACM Press, New York, NY, 482-487. DOI=http://doi.acm.org/10.1145/169059.169426.

Kurtenbach, G. and Buxton, W. 1994. User learning and performance with marking menus. In Conference Companion on Human Factors in Computing Systems (Boston, Massachusetts, United States, Apr. 24-28, 1994). C. Plaisant, Ed. CHI '94. ACM Press, New York, NY, 218. DOI=http://doi.acm.org/10.1145/259963.260376.

The International Searching Authority issued a "Notification of Transmittal of the International Search Report and the Written Opinion of the International Searching Authority" on May 5, 2008 related to International Application No. PCT/US04/00162.

Screen Dumps of Macromedia Flash MX (Mar. 14, 2002, pp. 1-7).

* cited by examiner

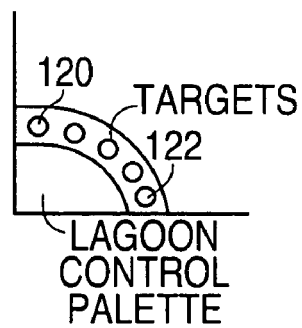
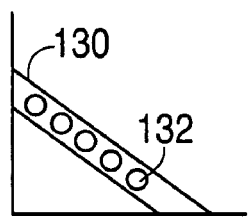
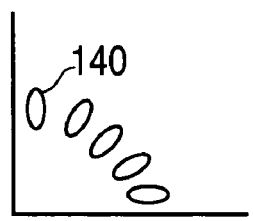
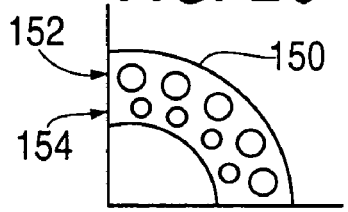
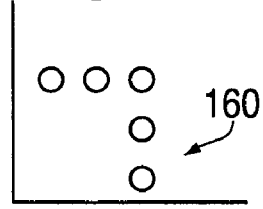
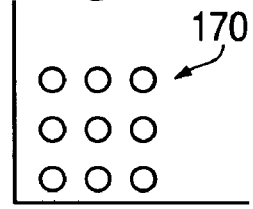
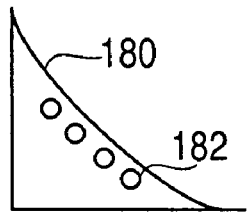
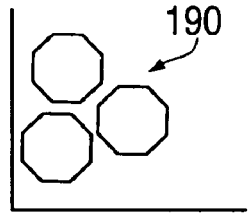
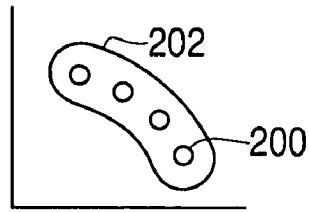
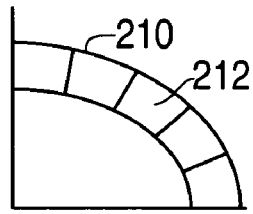

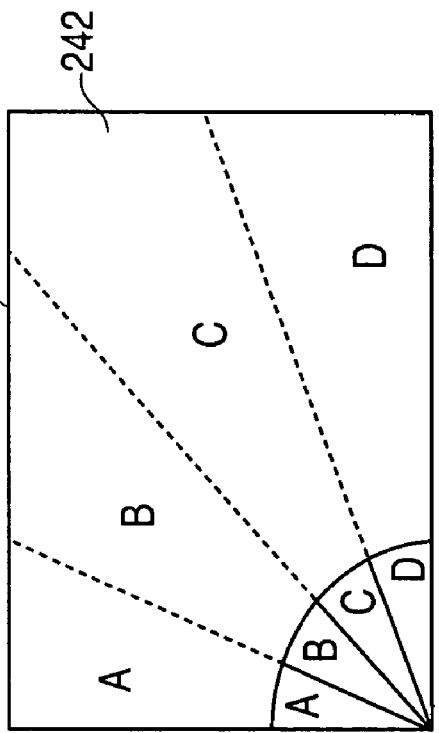
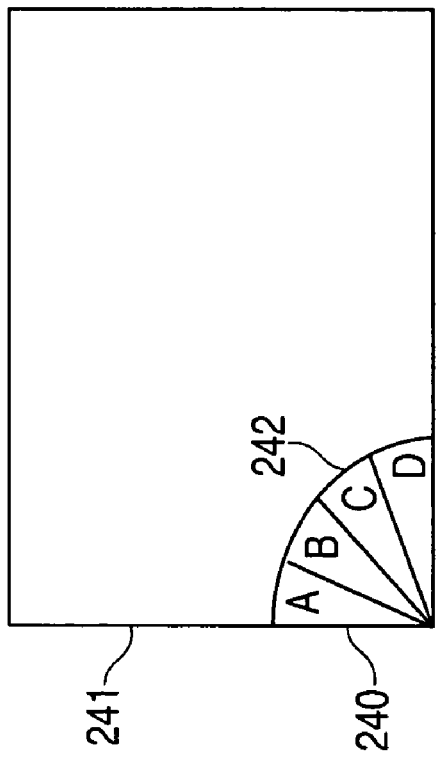
FIG. 30A
FIG. 30B

APPROACH PATH TO TARGET

USER INTERFACE HAVING A PLACEMENT AND LAYOUT SUITABLE FOR PEN-BASED COMPUTERS

CROSS-REFERENCE TO RELATED APPLICATION(S)

This application is related to and claims priority to U.S. provisional application entitled User Interface Techniques For Pen-Based Computers having Ser. No. 60/438,499, by Fitzmaurice et al, filed Jan. 8, 2003; this application is related to U.S. application entitled A Layer Editor System For A Pen-Based Computer having Ser. No. 10/748 685, by Fitzmaurice et al, filed concurrently herewith; and this application is related to U.S. application entitled Biomechanical User Interface Elements For Pen-Based Computers having Ser. No. 10/748,684, by Fitzmaurice et al, filed concurrently herewith; and all of which are incorporated by reference herein.

BACKGROUND OF THE INVENTION

1. Field of the Invention

The present invention is directed to an interface positioned, typically in a bottom corner of a display or window of a pen-based computer, to allow a natural motion approach to controls of the interface and, more particularly, to an interface that allows a natural arc path approach with expanded approach zones, reduced selection interference and menu pop-ups where all commands can be accessed.

2. Description of the Related Art

Pen or stylus based computers, such as tablet personal computers (PCs) and personal digital assistants (PDAs), are becoming popular. These computers typically allow the user to interact with the computer through a graphical user interface using a stylus or pen (or possibly even a finger). A keyboard and a mouse are typically not available. Pen-based type interaction can be limiting as compared to other types of interaction, such as using the mouse or the keyboard, alone or in combination. What is needed are improvements to the interaction capability of pen-based computers.

Operating pen-based user interfaces in the tablet-PC form factor can be extremely awkward and uncomfortable. Repetitive actions will be common and operating the user interface along the borders of the screen is problematic. First, the digitizer behaves poorly around the borders of the screen and thus it is hard to control the cursor using the stylus. Secondly, positioning the hand along the digitizer edge can be uncomfortable and unstable to operate with precision. What is needed are solutions that employ a design that moves away from the digitizer edge and adhere to comfortable human motions will be valuable.

Typical interface elements, such as a slider, are rectilinearly positioned, such as located horizontally or vertically relative to the display, often times along the sides of the display, such as a top of the display menu bar. Using such interface elements with a pen typically requires a compound movement by the user that may include rotating at the shoulder to essential slide the elbow, pivoting the elbow during the sliding motions and rotating the wrist. Such compound movements are more difficult that simple movements, such as pivoting of the elbow, at can cause fatigue in the user when receptively done. What is needed is an interface element that conforms to more natural simple motions by the user.

SUMMARY OF THE INVENTION

It is an aspect of the present invention to provide an interface at a location that allows a natural motion to approach the interface.

It is another aspect of the present invention to provide an interface approach with expanded approach zones and reduced selection interference.

The above aspects can be attained by a system that positions the interface at an end of a natural user motion arc, such as an arc a hand travels when an elbow is pivoted. A position of the interface in a lower corner of a display or window allows easy natural arc motion, approach when the user is working in a center of the display, such as when drawing on a pen-based computer display. An arc or curved interface in the corner location improves approach zones and reduces unintended selections. The arc also positions controls away from a display edge.

These together with other aspects and advantages that will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 16-31 depict additional embodiments of the interface of the present invention.

DETAILED DESCRIPTION OF THE PREFERRED EMBODIMENTS

The present invention is directed to a user interface, widget or control optimally placed on a display of a tablet-based personal computer (tablet PC) to take advantage of natural user motion. The interface, called the command corner or lagoon for convenience, specifically factors in the biomechanical properties of human user. The main context of this invention is on portable, pen-based computers but expands to other input scenarios such as electronic white boards, tablet digitizers, desktop PCs or virtual reality applications.

The present invention provides a core region (see FIG. 3) where the main user interface components are housed that maximizes the ability to uniquely hit the targets and issue command gestures on the targets (e.g., marking menus). The command corner, or lagoon, is preferably located in the bottom left side of the screen for right-handed users (and vice versa for left handed users). This is an optimal placement due to the natural arc motion of the arm pivoting at the elbow and a user working in the center of the display screen.

A significant feature of the present invention is the strategic placement of the target components within the command corner. The target components can be one-shot commands or trigger sub-components/sub-commands (such as pop-up menu technology). The invention specifies that the optimal placement of the target components is an arc shape. This allows the broadest unique angle of approach from the center of the working canvas to the command targets. Having a unique angle of approach allows users to more reliably hit the target without a concern for selecting nearby targets. As a consequence of this design, the inner area of the command center is maximized given the minimum outer edge (which is called the leading edge).

The targets denoted by icons can be spaced to best accommodate marking menu strokes, gestures and pop-up menus/widgets. Thus, having the targets away from the edges of the screen allows for more gesture space. In addition, extra space is left at both ends of the lagoon arc.

The entire command corner (or some portion of it) can be displayed in a semi-transparent fashion to see the underlying application data and minimize visual distraction.

Additional user interface controls, indicators and feedback can be provided in the interior region of the command corner.

Multiple arc shaped rows can be defined to accommodate more functionality.

A special sub-component or control of the command corner can be designated as a toggle to collapse or minimize the command corner, which can later be selected to restore the command corner.

Figure 1:
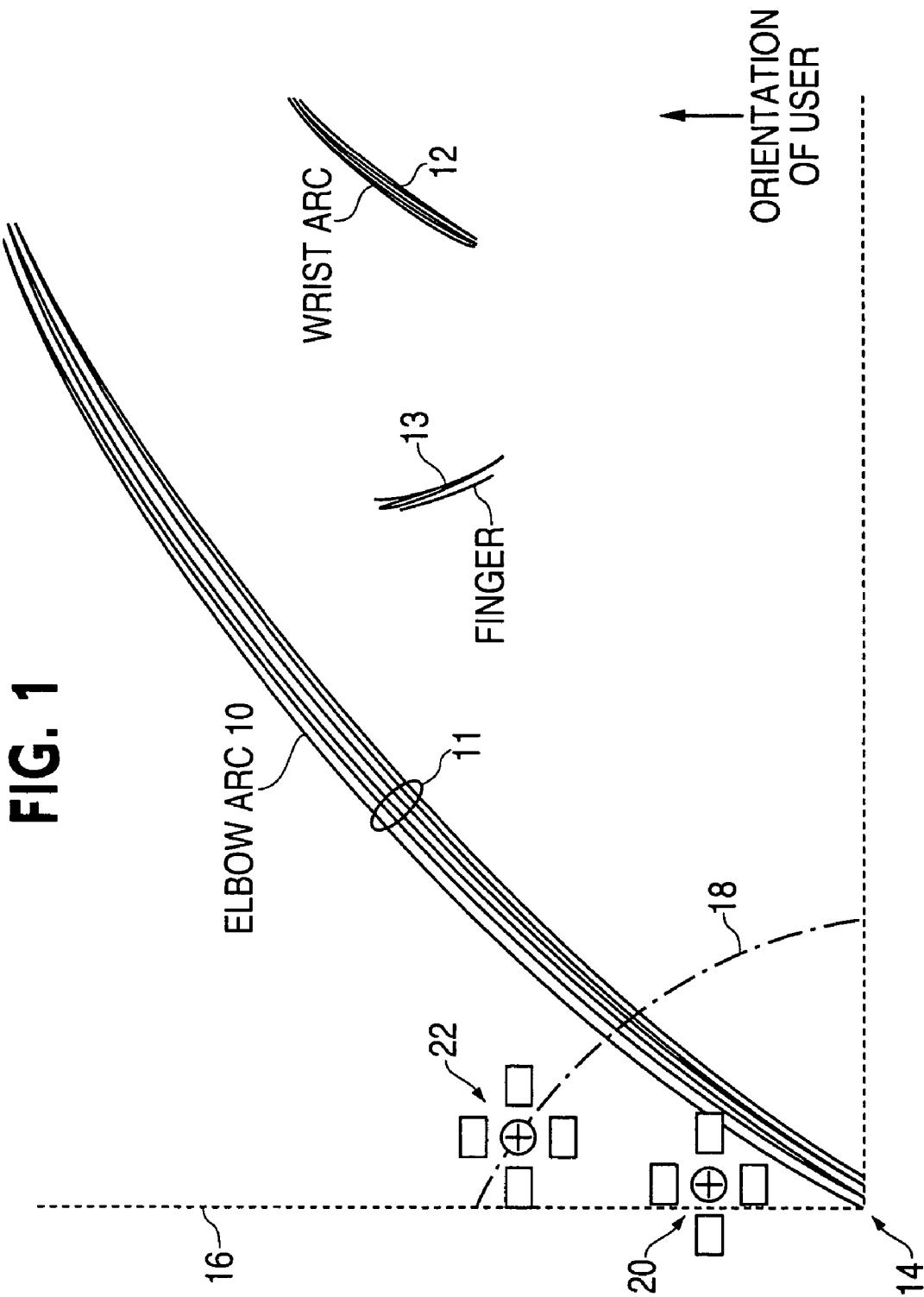
FIGS. 1 and 2 illustrate natural arcs and an interface layout that takes advantage of the natural arcs.

As discussed above, the interface of the present invention is placed at a location to take advantage of the natural arc motion of the arm of pivoting at the elbow, moving a hand holding a stylus of the tablet PC across the display where the user working in the center of the screen. Users of PC menus typically think of menus as having a top to bottom or left to right order and a learned movement is to access a menu item by moving the cursor in a typically downward direction. The present invention operates primarily with the dominant natural movement. This dominant natural elbow arc 10 (for a right handed person) is depicted in FIG. 1 by typical drawing strokes 11 of a user along with the arcs formed by strokes made via motion of a wrist 12 and fingers 13 of the user. This arc 10, when combined with the downward access direction learned behavior noted above, naturally carries the hand of a right-handed person holding the stylus to a lower left corner 14 of a display 16 (depicted by dashed lines) from a central region of the display. A command menu placed at the end of this arc 10, such as in the corner 14, can be more naturally accessed by the user with a neutral posture (no motion of the wrist or fingers) than other types of menus. By making the command menu itself arced, such as depicted by the dot-dashed line motion extension arc (or anti-dominant arc) 18, a slight motion by the wrist along the wrist arc 12 or a slight motion by the finger arc along the finger arc 13, the will allow travel of the stylus from the central region of the display 16 toward the corner to be altered to travel a path that takes the stylus to any point along the extension arc 18. Thus, a dominant motion around the elbow and a slight motion by the wrist or fingers allows easy natural access to commands in the command corner. The extension arc 18 preferably intersects the dominant arc at a ninety (90) degree angle. A curved or arced interface as compared to a rectilinear interface has expanded approach zones are reduced interaction interference as will be discussed in more detail later.

FIG. 1 also depicts a pop-up menu 20 having four (4) commands popping up at a location near the left edge of the display 16. As can be seen, one of the commands is actually positioned off of the left edge of the display 16 and is not accessible to the user. To prevent this, the arc 18 preferably has a radius that positions the pop-up controls so that all of any underlying commands are accessible. That is, the arc 18 radius is at least the equal to a radius of any pop-up menu that pops up by activating a control located on the arc 18. In addition, the pup-up menus for the controls of the menu arc 18 are preferably located along the arc 18 at a distance from the display edge greater than or equal to the radius of the of any pop-up menu located on the arc 18. The menu 22 depicts an example of a location for a pop-up menu for a nearby control on arc 18. A pop-up warping alternative to such an inward location of a pop-up menu is to not place commands of the pop-up on a side of the hot spot closest to the display edge.

The arcs 10, 12 and 13 (as well as for arcs for other types of displays, such a shoulder arc for a white board) can be standardized or custom as discussed in the related biomechanical interface application noted above.

Figure 2:
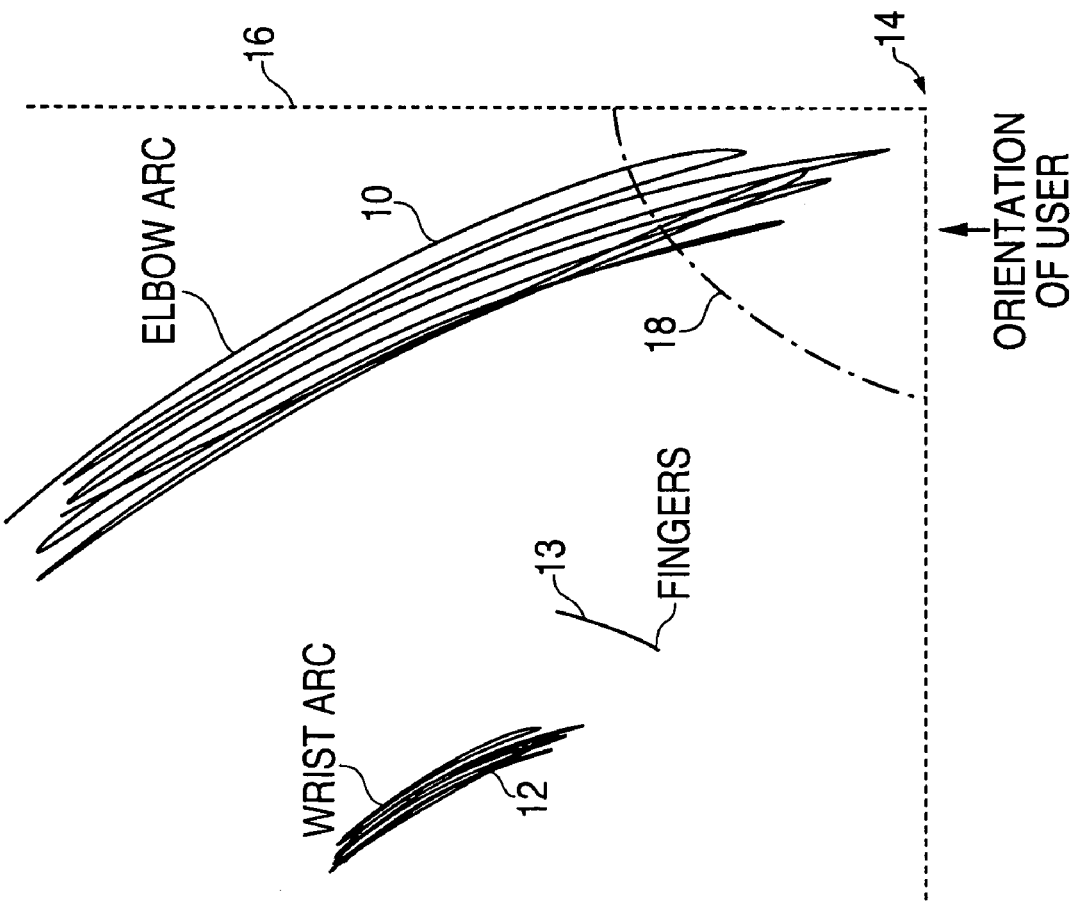

The arcs and preferred interface locations relative to the display for a left-handed person are depicted in FIG. 2 as in the lower right hand corner of the display. Of course the command corner can be located in the upper corners (upper right corner right for a right-handed person and upper left corner for a left-handed person), since the arc 10 also extends upward.

Figure 3:
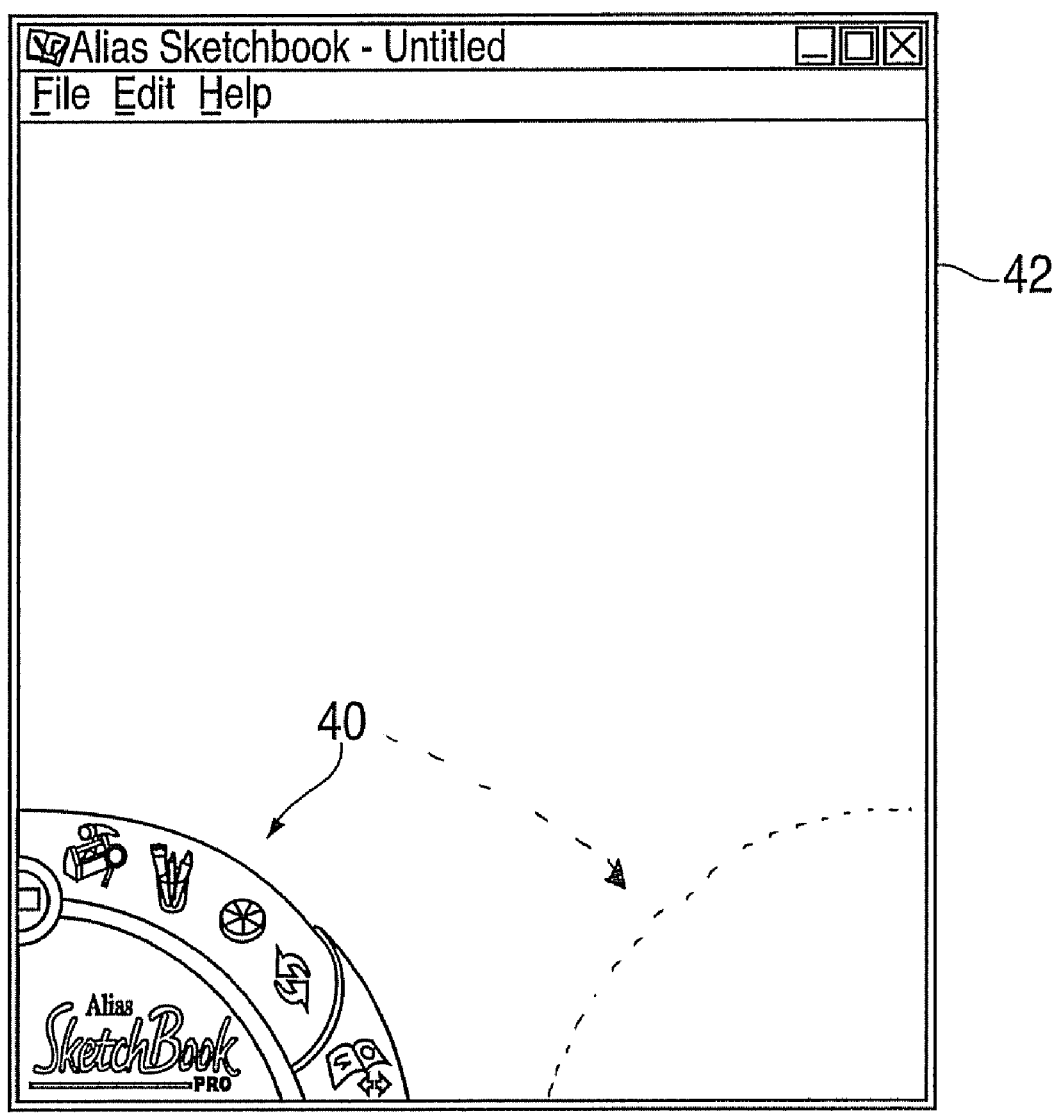
FIG. 3 depicts a preferred interface for a drawing application.

FIG. 3 depicts a command corner 40 preferably located and arranged in a display window 42 according to the natural motion and command accessibility characteristics for a right-handed person as discussed herein. This command corner 40 will be discussed in more detail later herein. This command corner interface 40 is conventionally produced by a display graphic bit map with a curved design as depicted in FIG. 3 and having the corresponding bit mapped control or hit zones for the commands of the interface.

Figure 4:
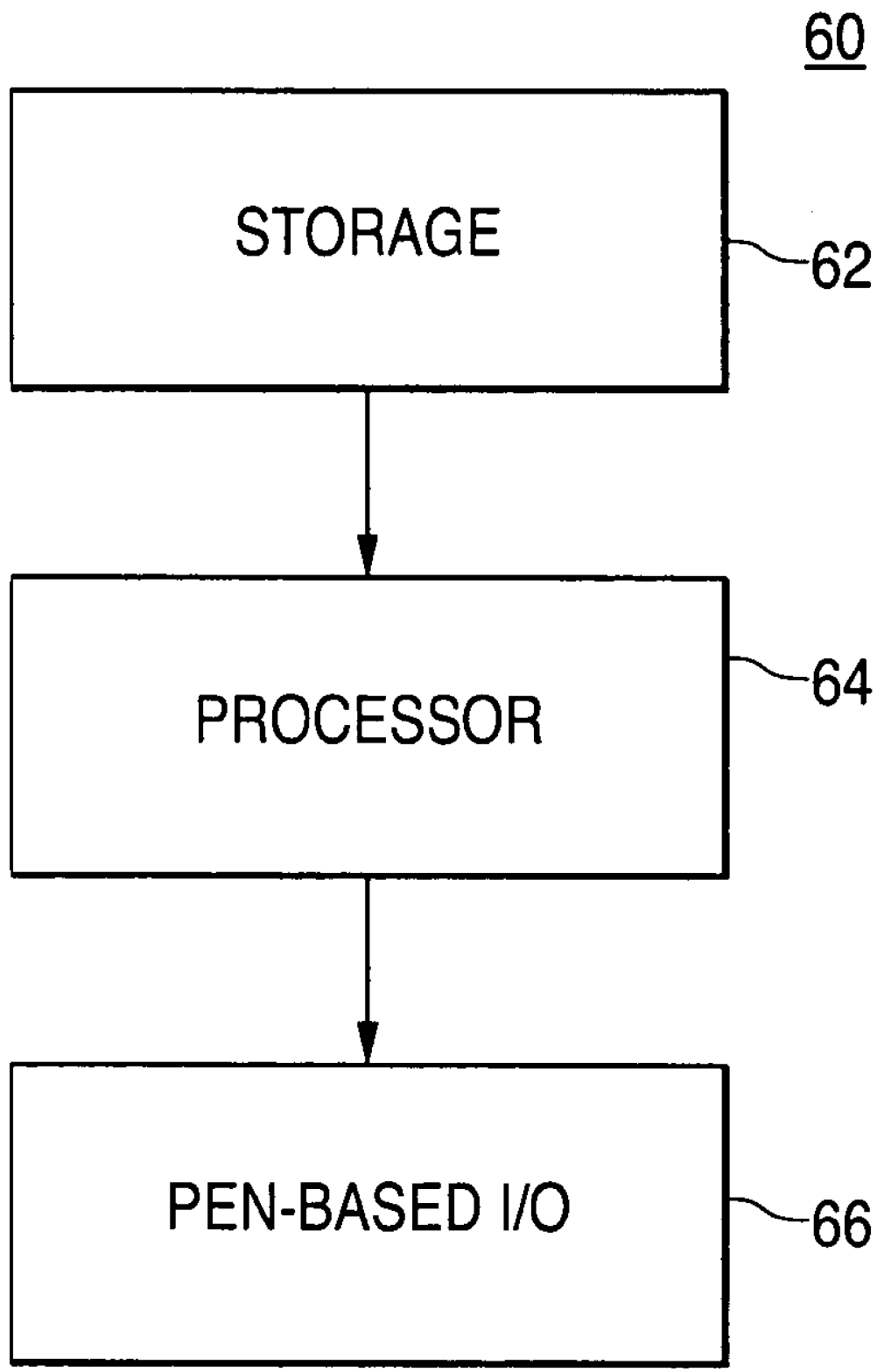
FIG. 4 depicts hardware of the present invention.

The present invention preferably uses a hardware platform 60 as depicted in FIG. 4. This platform 60 includes a conventional storage 62 (RAM, ROM, hard disc, floppy disc, CD, DVD, etc.) for storing layer editors, paint programs, data structures, data, etc. used by the present invention as well as the processes, bitmap graphics and bitmap hit zones of the invention discussed herein. The platform 60 also includes a conventional processor 64, typically a tablet personal computer (tablet PC) class machine. The platform 60 further includes a conventional pen based I/O system 66, such as a display with a pen based digitizer, and optionally includes conventional I/O components, such as a key board, floppy disc, mouse, etc.

Figure 5:
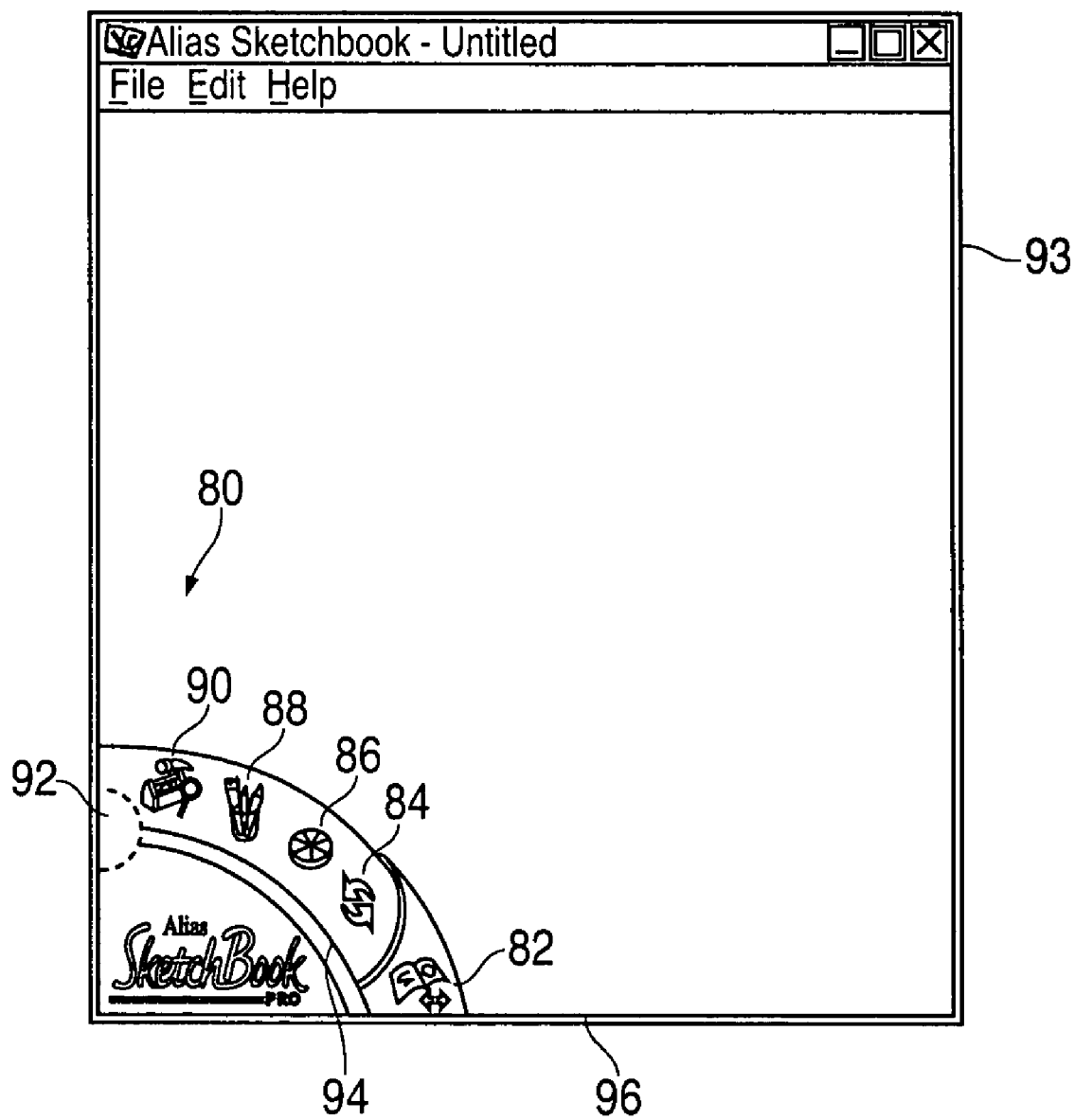
FIG. 5 depicts additional locational and arrangement details of the drawing interface.

The command corner 80 (40) of FIG. 5 (see also FIG. 3) is designed for a drawing application (Alias SketchBook™) and includes six controls 82-92 in display or display window 93. These irregular shaped controls icons include a page or file flipping control 82 (next/previous page/file), a redo/undo or edit control 84, a color selection control 86 that allows the color applied by a tool to be selected, a tool (brush or pen) type control 88, a tool selection control 90 and a interface change control 92 that allows the user to hide, suppress or minimize the interface 80 or to move the interface to a different location, such as a different corner or a position along a side of the display or window 93. This control 92 can be explicitly shown (see FIG. 5) or invisible or be shown in a conventional shadow mode as indicated by the dashed line in FIG. 4. In shadow mode the interface is shown by some mechanism that indicates the presence of the interface but in an inconspicuous way. For example, the interface can be shown with dashed lines or with a slight change in the color or contrast of the portion of the interface in shadow. An inner radius 94 of the interface 80 is preferably offset from the opposite edge by at least the radius of a pop-up menu. For example, the control 90 is offset from the bottom edge 96 by the downward radius of any menu or control that appears when the control 90 is activated. The controls 90 and 82 are also preferably located a distance in from their corresponding edges by at least the radius of any underlying menu. For example, control 82 is located inward along arc 94 from edge 96 by the downward radius of any menu that pops up when the control 82 is activated. Rather than position pop-up menu type controls next to the display edge, it is preferable to place one-shot controls next to the edges. For example, control 82 can be a one-shot control that always causes the display 93 to display the next page (or reverse and display the previous page when the last page is being displayed). Note, the hit zone underlying each control need not conform to the shape or size of the graphic or icon for the control. The controls along the arc, alternatively, could correspond to the traditional linear menu bar at the top of the screen. For example, the controls could be: File, Edit, etc.

The command corner of the present invention, when designed for a drawing application, preferably has at least two controls, one control 88 (i.e., marking menu) for selecting brushes and one control 86 for selecting colors. Other controls can also be used in a drawing application and so the preferred command corner has five main control groupings: tools, brushes, colors, edit and file. In addition, we the preferred command corner has a sixth control element that manages the lagoon placement and window configuration.

Figure 6:
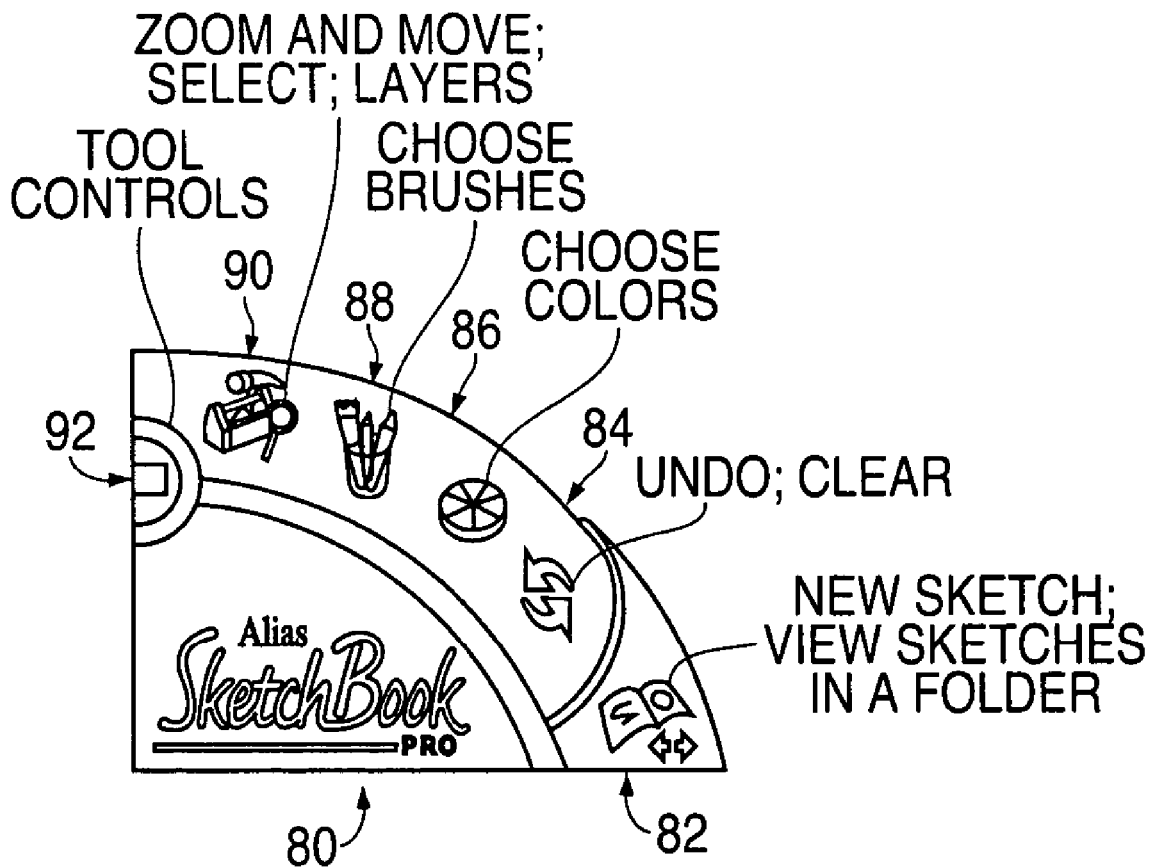
FIGS. 6-15 depict details of underlying marking menus

FIG. 6 depicts the command corner in more detail showing the preferred icons as a page flip icon for control 82, a reversing arrows icon for the edit control 84, a color palette icon for the colors control 86, a group of brushes icon for the tool control 88, a set of edit tools icon, such as a magnifying glass for the control 90 and page display icon for control 92.

Figure 7:
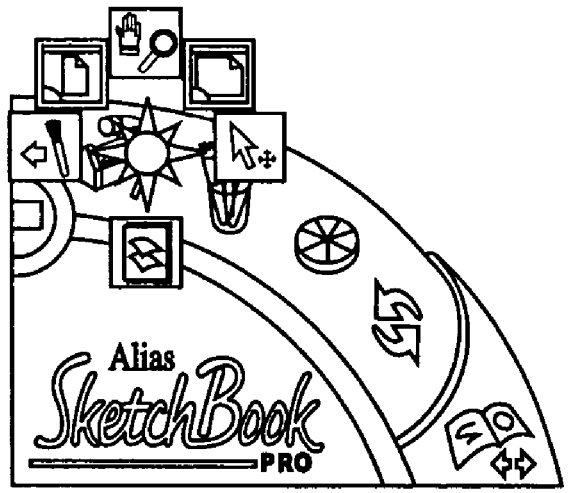

FIG. 7 illustrates the marking menu for the control 92 showing in iconographic form the controls available with this Modes marking menu showing controls for: Last Brush (West), Actual size (NorthWest), Move and Zoom (North), Fit to View (NorthEast), Select tool (East), and Layer Dialog (South).

Figure 8:
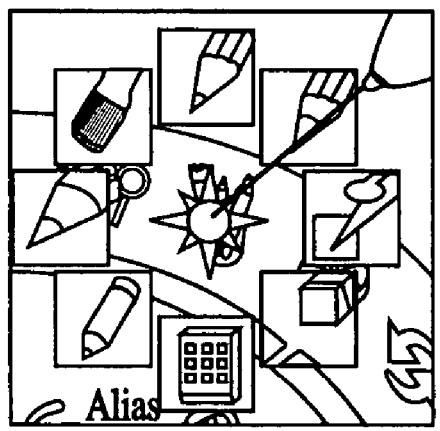

FIG. 8 depicts the default Choose Brush marking menu for control 88 showing controls for: Highlighter (West), Paint-Brush (NorthWest), 2H Pencil (North), 2B Pencil (NorthEast), Airbrush (East), Eraser (SouthEast), Brush Selector (South), and Ballpoint Pen (SouthWest).

Figure 9:
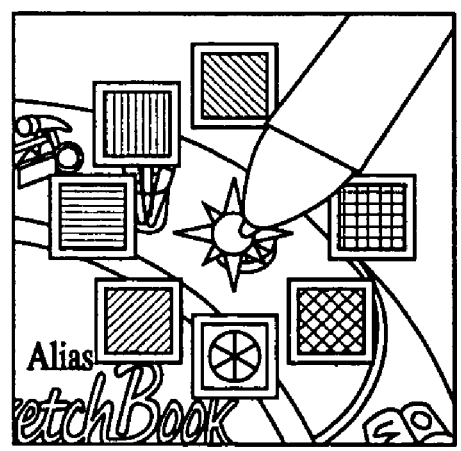
Figure 10:
Figure 11:
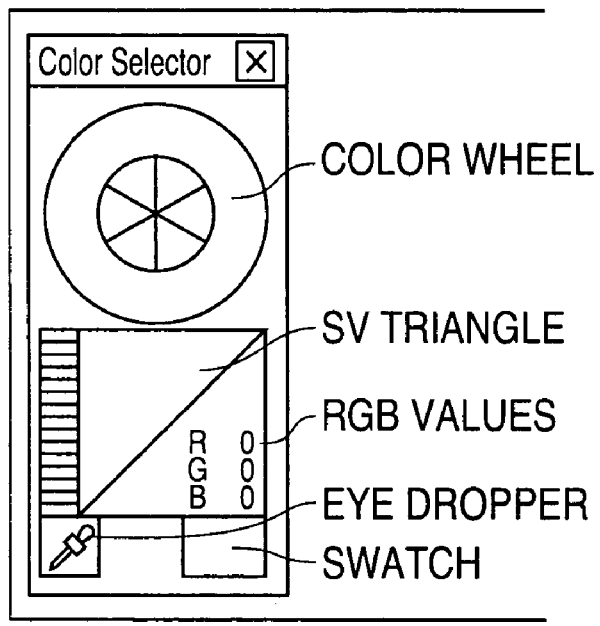

FIG. 9 shows the default Choose Color Set marking menu for control 86 showing controls for (starting from North and going clockwise): Black, Green, Red, White, Color Selector Dialog, Purple, Blue, and Yellow. When the user selects the color dialog selector by marking south as depicted in FIG. 10, a color dialog box as depicted in FIG. 11 is displayed.

Figure 12:

FIG. 12 shows the default edit or Undo and Clear marking menu for control 84 showing controls for: Clear (North), Redo (East), Grow Page (South), and Undo (West).

Figure 13:
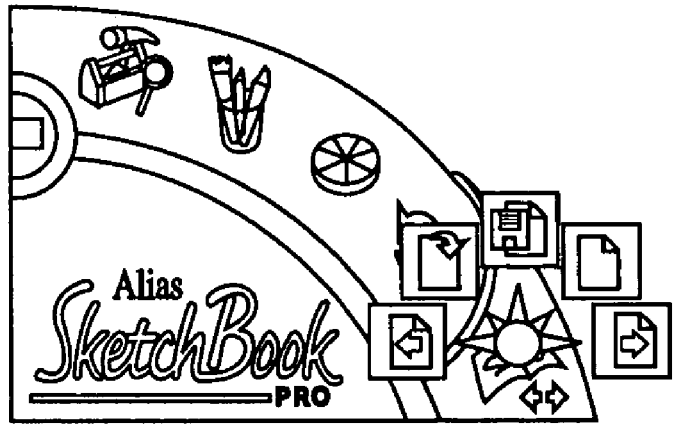
Figure 14:
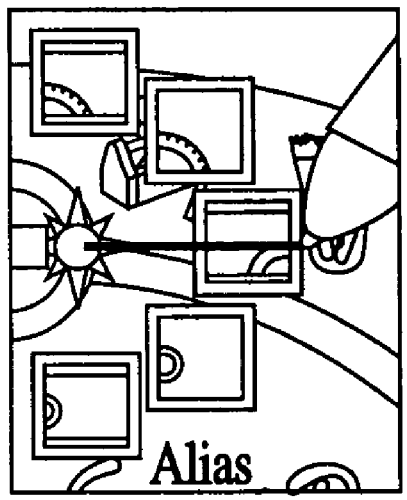

FIG. 13 shows the default Page marking menu for control 82 showing controls for: Previous Page (West), Open (NorthWest), Save (North), New (NorthEast), and Next Page (East FIG. 14 shows the default Command corner marking menu controller for control 92 with the user is issuing command (a stroke to the east) to move command corner to right side of screen. The menus for this Menus are: Title bars; Full Tool Interface (North), No Title bars; Full Tool Interface (North East), Move Tool Interface to Right Side (East), No Title bars No Tool Interface (South East), and Title bars; No Tool Interface (South).

Figure 15:

FIG. 15 shows the Command corner on right edge of window. The positioning of the marking menus for command corner controller have changed slightly: Title bars; Full Tool Interface (North), No Title bars; Full Tool Interface (North West), Move Tool Interface to Right Side (West), No Title bars No Tool Interface (South West), and Title bars; No Tool Interface (South). Note that all other marking menus remain unchanged.

The present invention has a preferred mark selection that assists workflow. In this convention a downward stroke (the south item in a marking menu) will bring up additional tool palettes or dialogs. For example, the color marking menu (see FIGS. 8-11) has individual colors on all marking menu items except for the south item that brings up the color chooser dialog.

The command corner of the present invention can be semi-transparent or blend/filter with the underlying canvas window it is on top of (e.g., you can see through the command corner but the content looks slightly blue tinted). The relative size of the command corner compared to the icon size and rest of application window is important, as the targets must be large enough to be hit easily as discussed in the related application.

Figure 16:
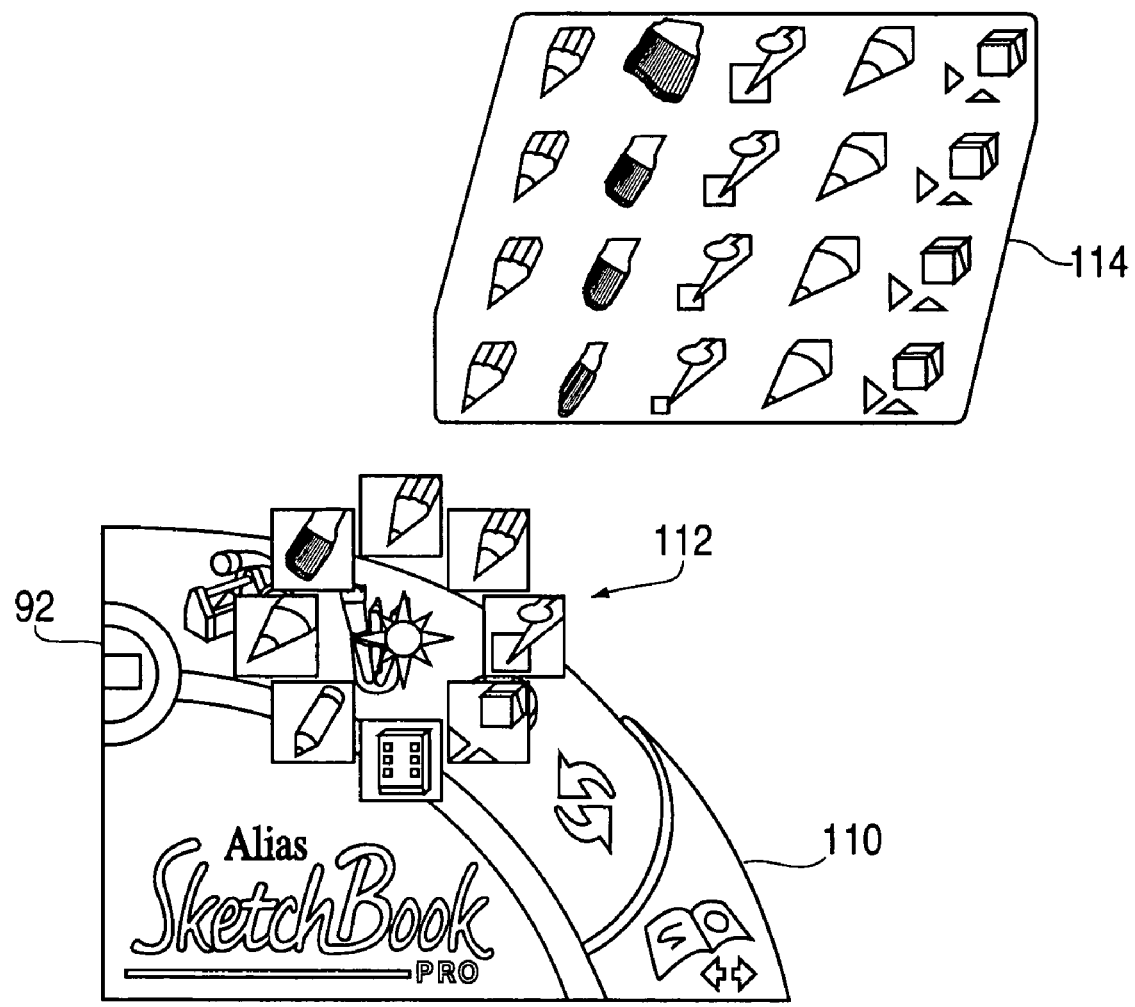

FIG. 16 shows the command corner 110 (40) with a marking menu 112 associated with control 88 activated. This menu 112 has an overflow menu 114 including overflow selections that are greater in number than can be displayed in marking menu format. The overflow menu 114 is preferably located along the dominant arc from the pop-up or hot spot of the menu 112. The items in the menu 112 are also preferably located in conformity to the dominant arc and the extension arcs discussed above. The menu 112 can also be laid out responsive to the dominant arc (or a combination of the dominant arc with an extension arc), such that a menu item can have an orientation consistent with the arc or an approach zone consistent with the arc as discussed in the related biomechanical application noted above.

FIGS. 17-31 depict alternate embodiments of the command corner.

FIG. 17 depicts a convex arc shaped interface 120 with circular targets.

FIG. 18 shows a linear interface 130 with circular targets 132.

FIG. 19 has oval targets 140 without a graphic interface border or outline where the larger axis of each oval is aligned with the approach path associated with the dominant arc and where the arrangement of controls is as a convex curve corner.

FIG. 20 depicts a convex interface with two rows or layers 152 and 154 of targets with the targets offset relative to the approach path along the dominant arc.

FIG. 21 shows targets arranged in a box shape 160 with convex corner.

FIG. 22 illustrates an array 170 of targets.

FIG. 23 illustrates a concave interface 180 with circular targets 182.

FIG. 24 shows polygonal targets arranged in an offset array 190.

FIG. 25 shows circular targets 200 in a bent oval interface 202.

FIG. 26 depicts a convex interface 210 of wedge shaped targets 212.

Figure 27:
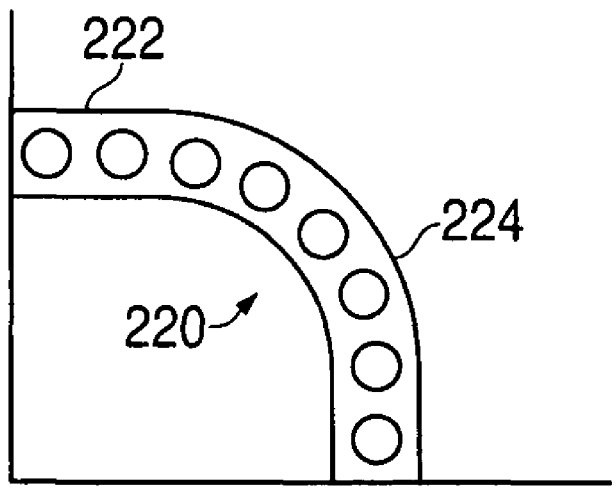

FIG. 27 illustrates an interface 220 with circular targets where the interface 220 has a straight or linear portion 222 and convex arc shaped portion 224.

Figure 28:
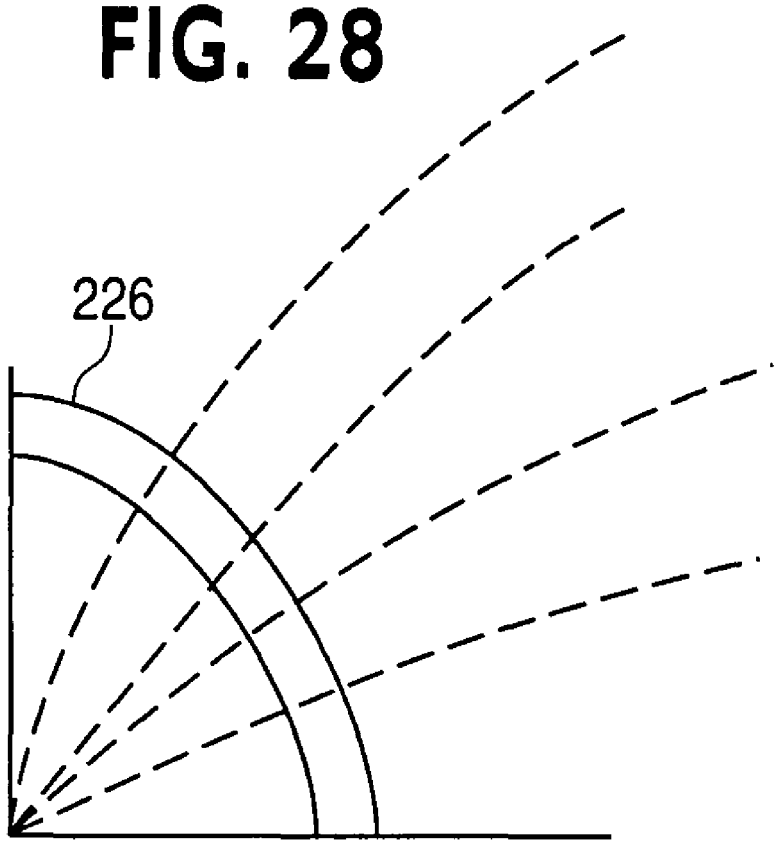

FIG. 28 depicts an interface 226 with controls and underlying hit zones having curved sides set according to approach paths associated with the dominant arc producing curved sided trapezoid type targets.

Figure 29:
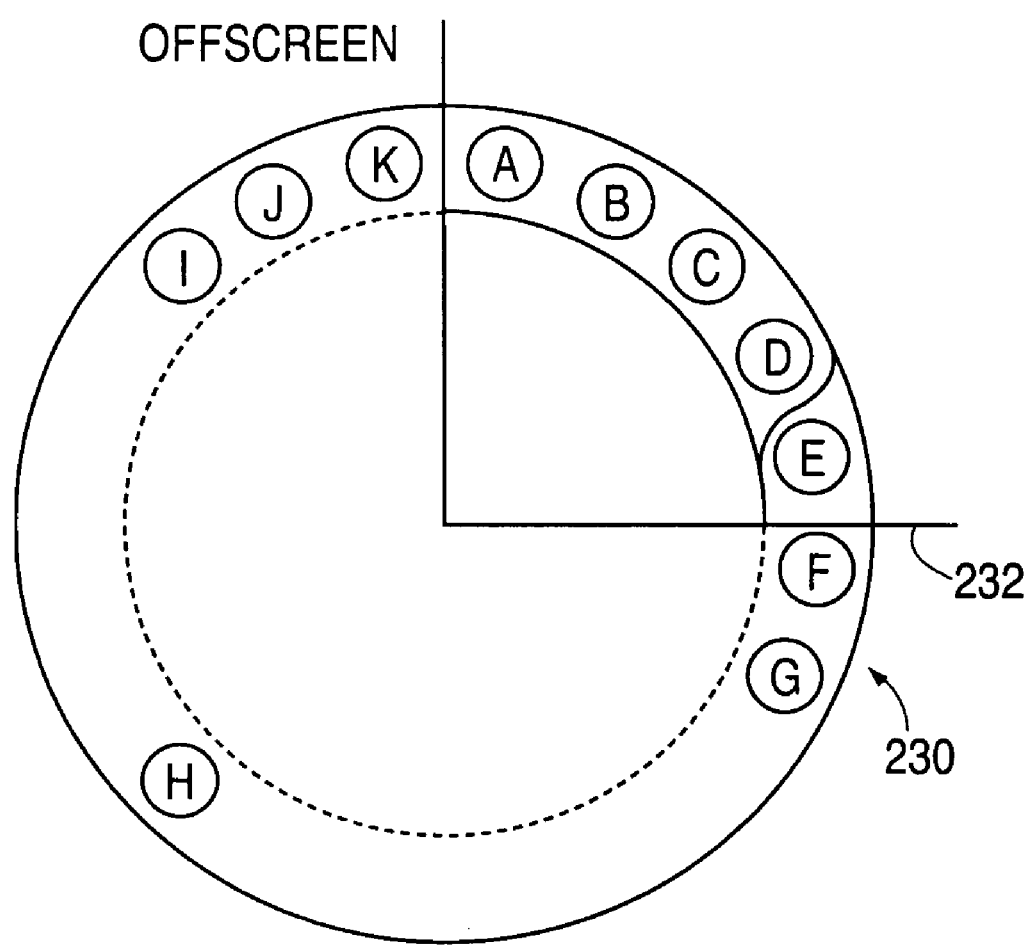

FIG. 29 depicts an interface 230 is existentially a circle of controls intersecting two sides of the display area edge and that allows additional off-screen functions or controls to be rotated into view on the display. Functions or controls A-E are currently visible and functions F-K can be rotated into view. The rotation can be conventionally performed by allowing the user to drag/rotate the interface around until a desired function is in view.

FIGS. 30A and 30B show an embodiment in which the target zones are expanded. A sectioned pie shaped command corner interface 240 (see FIG. 30A) in display 241 has pie slice shaped targets 242 (and corresponding hit zones) that can be accessed in a conventional way by positioning the cursor/stylus over the slice target and taping down on the display. If an additional control is available on the stylus, such as a conventional button the state of which is sensed by the digitizer system, the activation of the button causes the targets 242 (and corresponding hit zones) to expand to a predetermined size, such as covering the entire display as depicted in FIG. 30B. In this embodiment the demarcation between the targets can be invisible, shown explicitly with an extension of the interface graphics or shown in shadow mode as indicated by the dashed lines in FIG. 30B. Note the sides of the targets are depicted as linear, however, the sides can be curved responsive to the dominant arc thereby producing curve sided triangle type targets.

Figure 31:
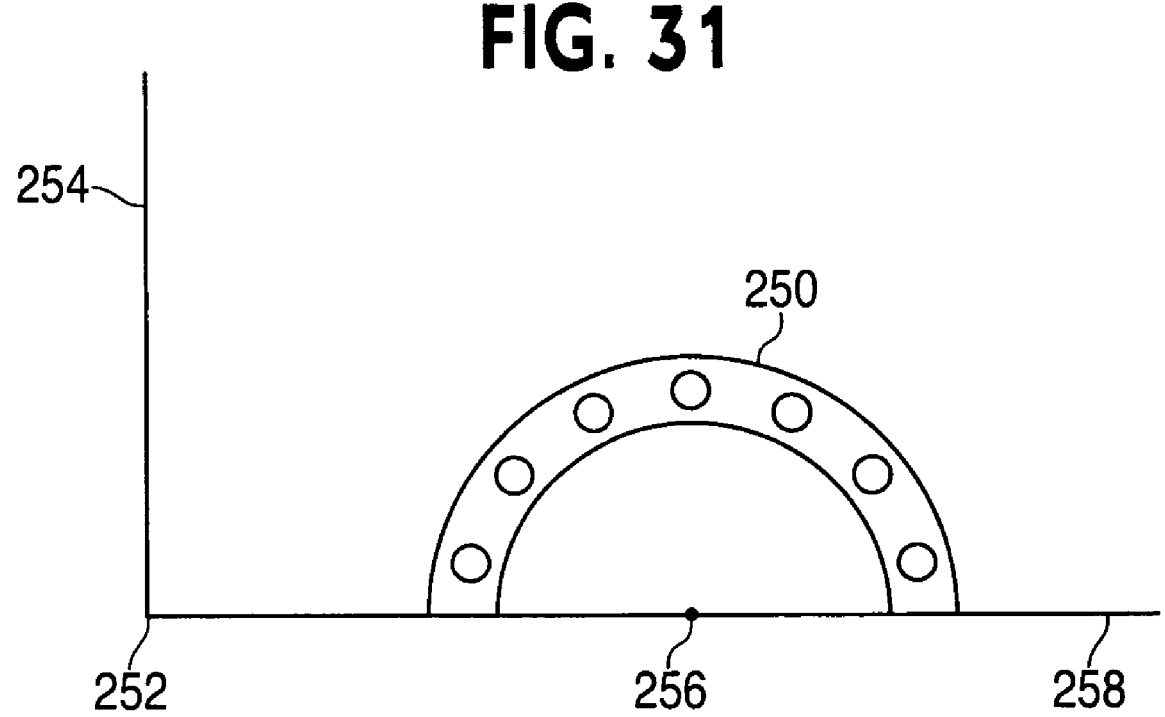

FIG. 31 depicts a command interface 250 that has been moved from a corner 252 of the display 254 to a position 256 on a bottom side 258 of the display 254. This interface preserves the natural stoke path approach to the interface 250 for most of the controls with a near neutral posture and the remaining controls can be accessed via the natural stoke path with an extension as discussed above. This interface also preserves an expanded approach zone for the controls. The command interface 250 can be moved to such a side position by dragging the interface to a desired and the system conventionally maps the quarter circle interface of a corner embodiment into a half circle.

Figure 32:
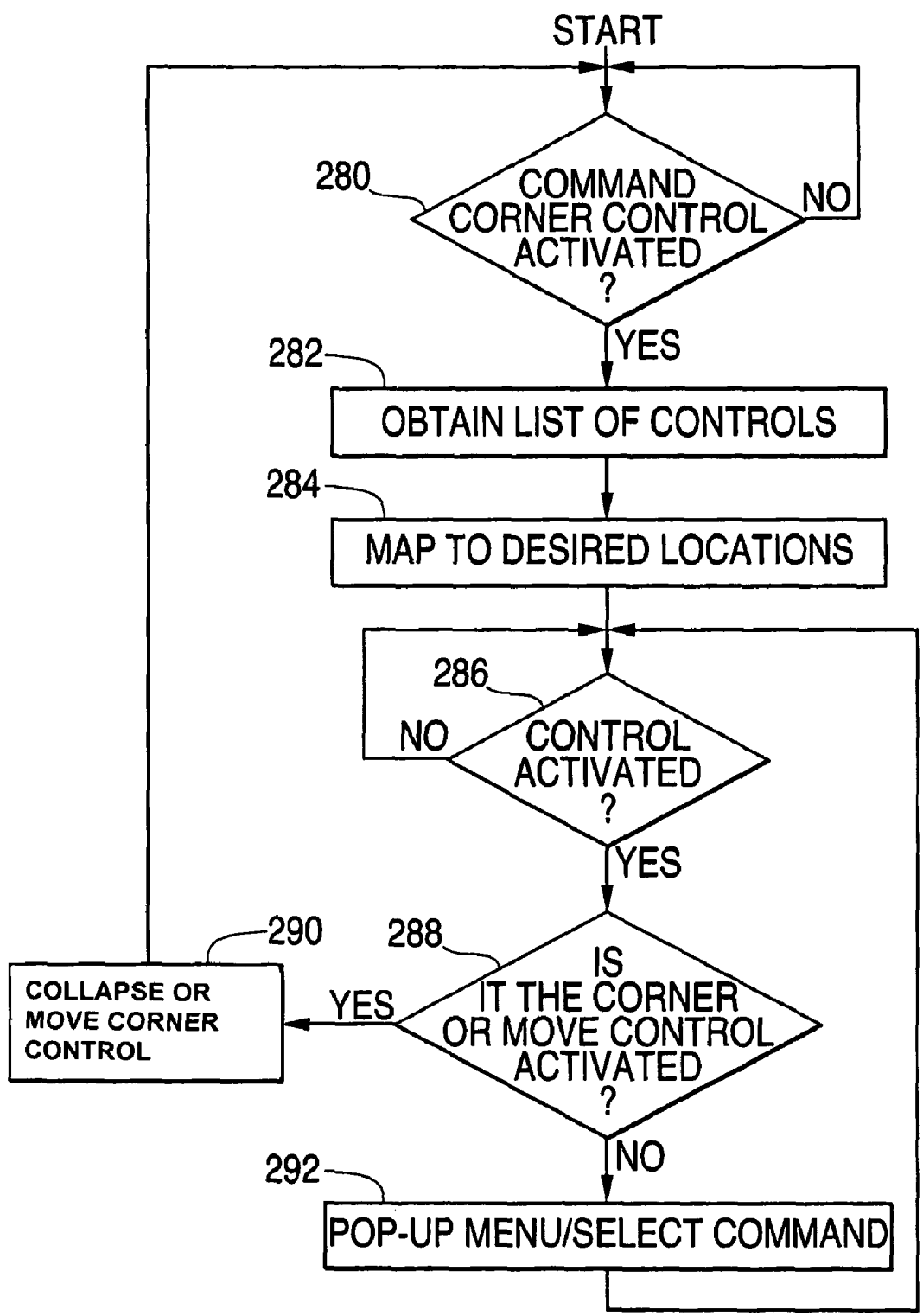
FIGS. 32 and 33 illustrate operations of the present invention.

FIG. 32 illustrates the operations of the present invention in displaying and allowing a user to use the command control of the present invention. The process starts with determining 280 whether the command interface has been activated. If so, the list of controls for the interface is accessed 282 and the controls are mapped 284 to their designated locations. This mapping can be to a pre-designated corner or a display side position and is preferably positioned responsive to the arc or arcs discussed herein. The mapping also depends on the radius of the arc in the corner of the display or display window. If the window is big the radius can be correspondingly bigger than for a small window. The radius is also affected by the size of any underlying menus activatable by the controls. The location of the controls placed along the arc also depends on the function of the control (one-shot) versus menu with a radius) as previously discussed. The user can also specify a desired custom position. The system then awaits a control activation 286, which typically occurs by taping the stylus on the surface of the tablet PC display within a hit zone of the desired control. During this wait period conventional display operations occur such as tracking the position of the stylus and positioning a cursor under the stylus, and highlighting a control when the cursor/stylus passes over (or close to) the control. The system conventionally determines whether a control or button has been activated by comparing a cursor position to a stored hit zone map when an input selection signal is received, such as the detection of a tap of the stylus on the display. If a control has been activated, the system determines 288 whether the control is the interface change control (see 92 of FIG. 5). If so, the function 290 of that control, which collapses/minimizes the interface or allows the user to position/move the interface to another location, is performed. If minimize is activated, the interface can be shrunk into a portion of a dot in the corner. If a change to the interface is not activated, the function of the activated control is performed 292. If the control is a one-shot control, the corresponding command is executed. If the control activates another menu, the menu is popped up and displayed if needed away from the edge or warped to pull all commands on the display. If the control activates some other function, that function is performed. The system then awaits another control activation.

In the present invention a special case can exist for moving the interface to another location when the move to the other side of the screen is requested. In the present invention the user is allowed to perform a "flick" gesture on the control 92 toward the other side of the screen to move the lagoon to the other side. Once the lagoon is on the other side of the screen, the opposite, reverse flick direction will move the lagoon back. Note that the lagoon shape and hit zones change when it is moved to the other side of the screen to a type of mirror image as discussed above. The flip is not a complete mirror flip on of the lagoon shape and contents. For example, most of the icons on the controls do not flip, nor does textual labels, such as the logo "Alias SketchBook" in FIG. 5).

Figure 33:
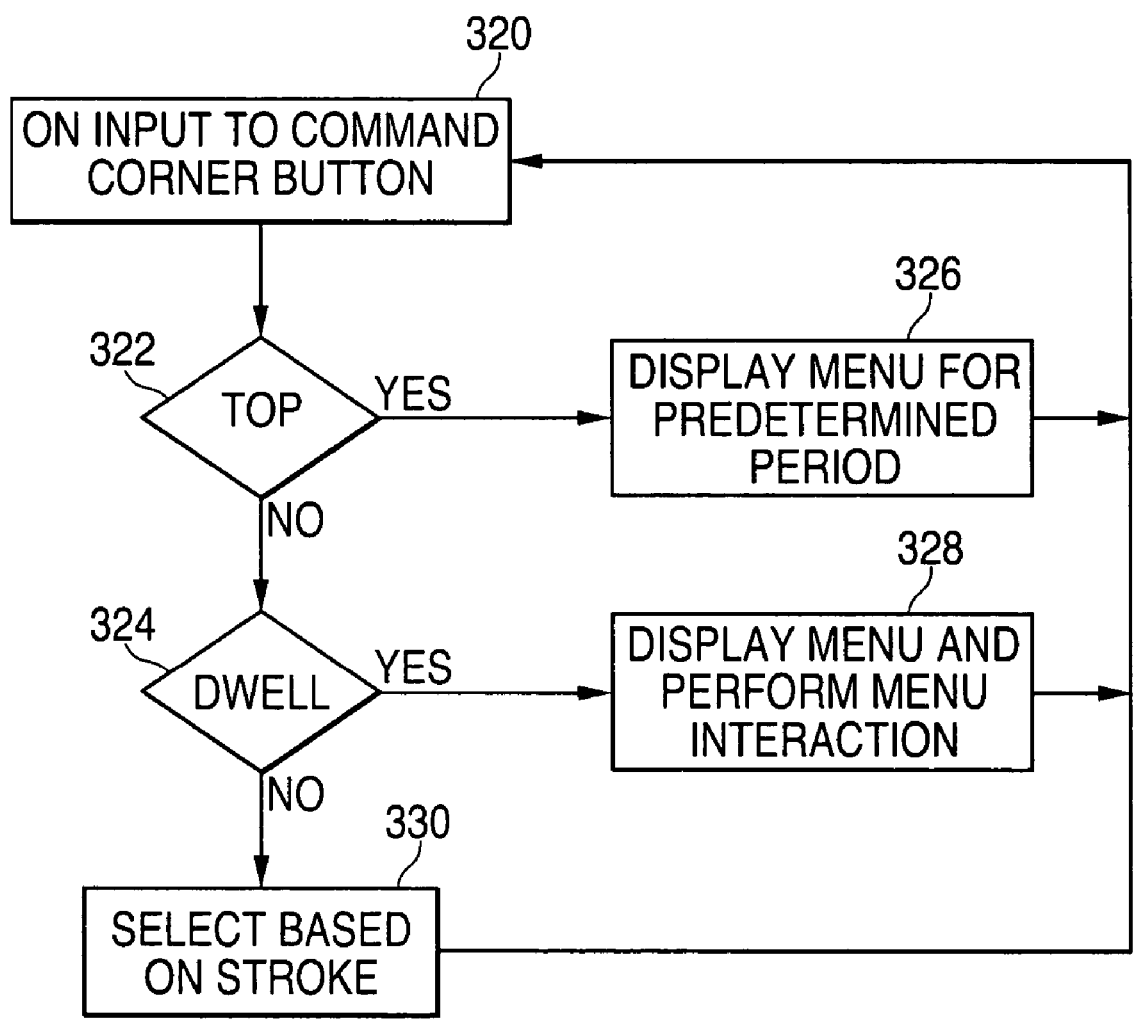

The performance of the action associated with the activated control is preferably performed to allow multiple approaches to selection of underlying or deeper menu level operations as depicted in FIG. 33. This preferred sequence starts with a button or control input being detected 320. The system then conventionally determines whether the input indicates a tap 322 or a dwell 324 or a drag (i.e., stroke). A tap is a momentary touching of or contact by stylus with the display, a dwell is a hovering of the stylus over a control location for a predetermined period of time and a stroke is a contact of the stylus with the display and a movement of the stylus while in such contact. If the input indicates a tap, the underlying menu is displayed 326 for a predetermined period of time. A tap event needs to be distinguished because sometimes a user's behavior is to explore the interface and they will do so by making quick taps on controls. If the system does not distinguish or detect taps, a user may not discover the underlying marking menus because they were not dwelling long enough to invoke the marking menu popup. The marking menu delay or dwell is necessary to prevent the marking menu pop up from displaying when an expert user of marking menus just wants to perform a flick gesture to issue a command. Without detecting a tap event, the system would have to always display the marking menu visuals when any pen-down event occurred. By detecting a tap, the system allows both worlds. Note that this design also allows the system to issue a default command when a tap is detected while still supporting standard marking menu interaction. If the input is a dwell, the menu is displayed 328 and a menu interaction is performed. If the input indicates a stroke, a marking menu type selection 330 is conventionally made responsive to the stroke.

The present invention is designed to improve the zone of approach for approaches to the interface by the movement of a stylus over a table PC type display in a natural motion, such as the arc shaped path of an elbow pivot dominated stroke. The design principle associated with the natural motion arc has been discussed above. Additional design principles will be discussed below.

Figure 34A:
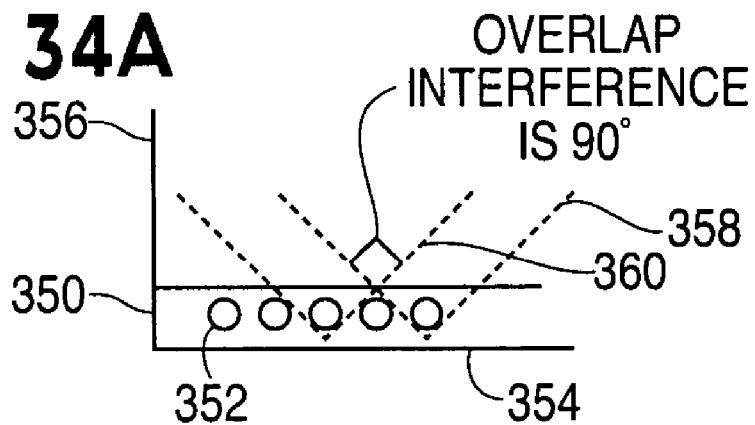
FIGS. 34A-36B illustrate design principles of an interface according to the-present invention.
Figure 34B:
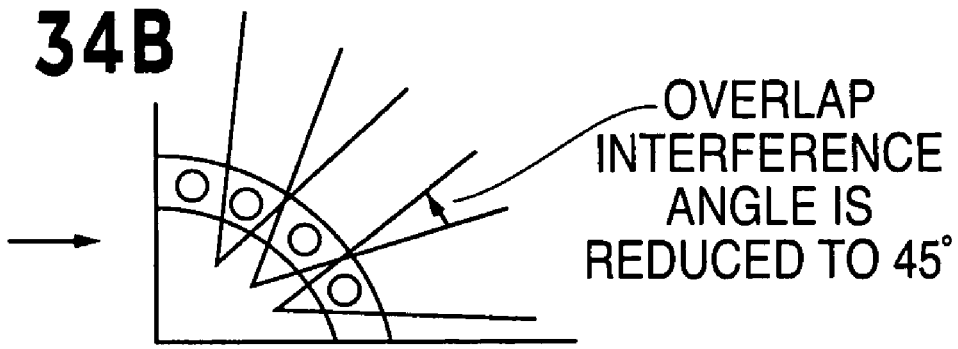
Figure 34C:
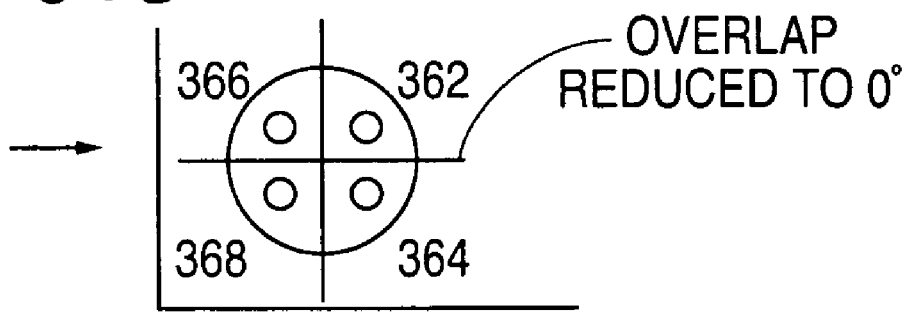

FIGS. 34A-34C illustrate an interference principle associated with designing such an interface. In FIG. 34A a linear interface 350 and arrangement of controls 352 along a bottom 354 of a display 356 is shown. To approach one these controls without taking a path that crosses over another one of these controls, this interface provides approach areas 358 and 360 that overlap and cause approach interference. This approach area interference is about 90 degrees. That is, the hit zones, if mapped to these approach areas, will overlap or interfere in the interface graphic 350. This can cause a user to mis-select a control. In FIG. 34C the interference caused by the approach areas 360-368 have been reduced to zero. However, the approach path to some of the controls, such as in area 368, is awkward. FIG. 34B depicts an interface, such as described herein, where the interference has been reduced. The invention reduces the approach area interference.

Figure 35A:
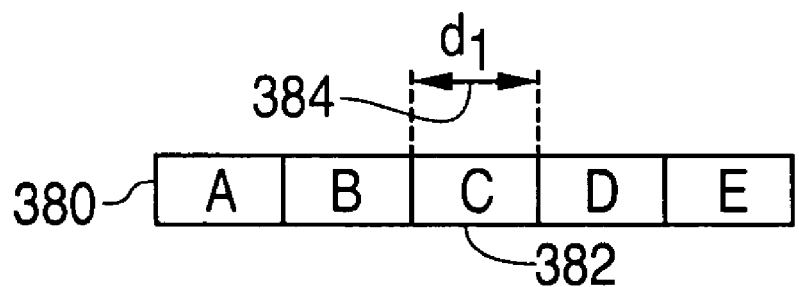
Figure 35B:
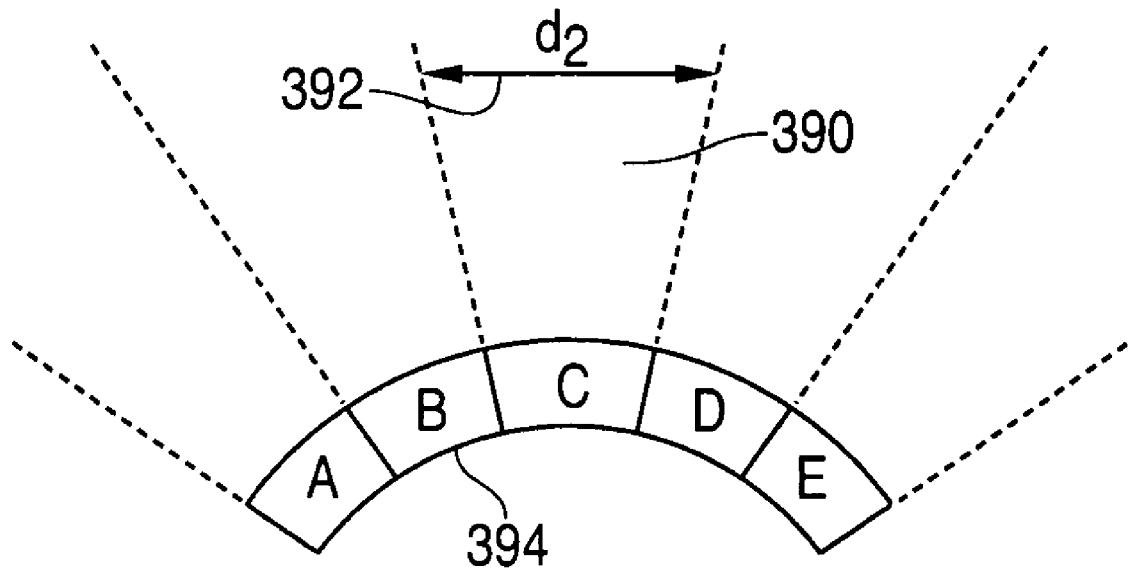

FIGS. 35A and 35B illustrate another design principle of the interface of the present invention called approach zone improvement. As depicted in FIG. 35A, a linear interface 380 has a control 382 with an approach zone 384 having a width distance 386 determined by the boundaries of the interface 380. This approach zone with width distance 392 can be increased by an arced or curved interface 394 that increase the angle of the zone 390 by arcing the entrance into the interface as discussed herein and as shown in FIG. 35B. The present invention expands the interface approach zone.

Figure 36A:
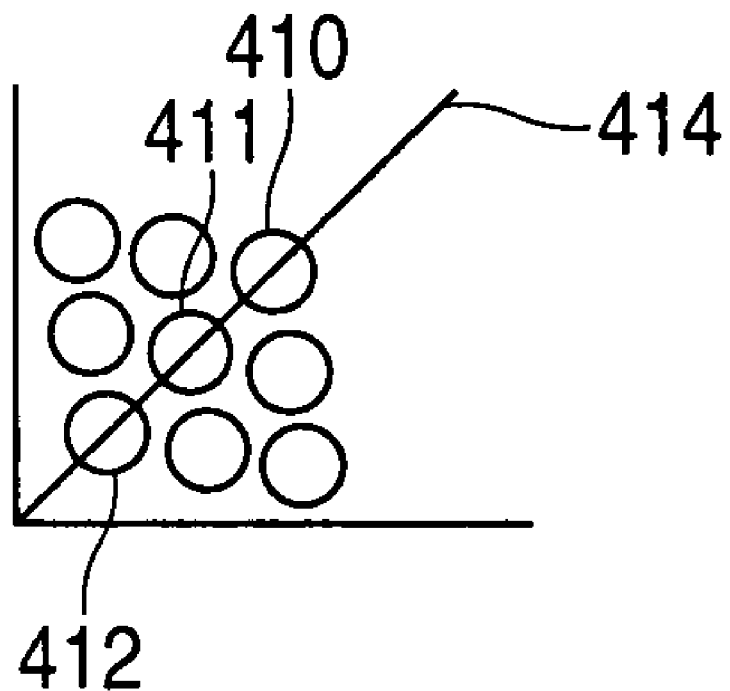
Figure 36B:
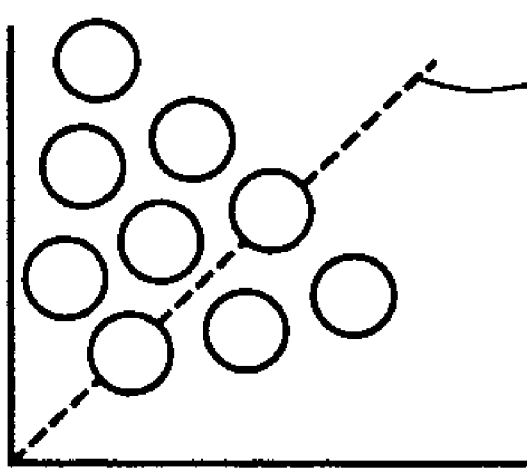

FIGS. 36A and 36B illustrate another design principle of the interface of the present invention when multiple layers of controls are provided in the interface. As depicted in FIG. 36A, controls 410, 411 and 412 in different layers can be aligned or coincident with the same approach path 414. The principle is to position the controls, if possible with non-coincident, dominant arc approach paths. This can cause path position selection errors where the user moves in along a path and moves too far or too little and mis-selects a control, such as control 411 when control 410 was desired. In an interface according to the present invention, an approach for two or more controls that have a path coincidence is designed to have a layer offset where controls of adjacent layers are offset in a direction perpendicular to the path and a path direction offset where controls on the same path are in different layers as depicted in FIG. 36B. This improves the spatial separation between controls and reduces mis-selection. The present invention offsets adjacent control layers and puts coincident path controls in different layers.

In the present invention, that if a user is inking in the drawing canvas and crosses into the command corner, inking still occurs on the underlying canvas (not on the command corner). In addition the command corner can include internal holes below the main arc. With such holes, a user can start laying down ink if the initial pen-down event falls within a hole and then they can continue and cross through the command corner and a continuous ink stroke will occur as expected.

The present invention has been described with respect to pen-based systems but touch screen or computer vision techniques for tracking human input are also applicable. Moreover, the present invention will work well for two-handed input systems. In a two-handed input situation the display could have two command corners active 40, as shown in FIG. 3 (one for each hand). A two-handed drawing program on hardware such as a large, rear-projected screen having multiple inputs (e.g., the SmartBoard from SmartTechnology), works well to have the non-dominant hand operate the command corner to switch color, brushes, modes, etc., while the dominant hand remains relatively stationary where the user is currently drawing with their dominant hand. In the context of the present invention there can be a distinction between a display screen and an application window. In the present invention, the command corner may change shape depending on the placement of the application window within the display screen as well as the command corner changing shape depending on the aspect ratio of the application window.

Tool mode and status indicators can also be housed within the command corner. For example, the current brush color and current tool mode can be visually shown within the command corner. Control elements housed within the command corner can also have "tool tips" where if a user hovers over an icon, a temporary text label pops-up to tell them what the icon is and it is dismissed when the pen moves.

The system also includes a computer readable storage including permanent or removable storage, such as magnetic and optical discs, RAM, ROM, etc. on which the process and data structures of the present invention can be stored and distributed.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An interface, comprising:
an interface area located in a lower left display corner for a right-handed user and in a lower right display corner for a left-handed user responsive to a natural motion by the user and associated with an end of a range of the natural motion, comprising:
an arc shaped graphic starting near a first display edge and ending near a second display edge and defining the interface area where the arc is substantially perpendicular to a natural motion path of the natural motion; and
controls located in the interface area and accessible via the natural motion, all the controls arranged along the arc shaped graphic visible and accessible at all times, wherein an interface location responsive to the natural motion of the user is a lower corner of a display area, wherein the controls arranged along the arc shaped graphic have an overlap interference angle of less than forty-five degrees.

2. A graphical user interface, comprising:
a persistent interface having an interface arc shape, located in a lower left corner of a display area for a right-handed user and in a lower right corner of the display area for a left-handed user, having graphics for controls arranged along the interface arc visible and accessible at all times and having control hit zones each with a zone shape responsive to an approach arc defined by a dominant motion arc of a motion of a user and associated with an end of a range of a natural motion by the user where the approach arc is substantially perpendicular to a natural motion path of the natural motion and with the graphics of the controls being located responsive to one-shot function or menu pop-up function with a pop-up menu radius, wherein the controls arranged along the interface arc have an overlap interference angle of less than forty-five degrees.

3. An interface as recited in claim 2, wherein the zone shape comprises one of a wedge, a curved sided triangle and a curved sided trapezoid.

4. An interface as recited in claim 2, wherein the zones have non-coincident, dominant arc approach paths.

5. A graphical user interface for a digitizer based drawing application, comprising:
- a persistent arc shaped graphic located in a lower left corner of a display area for a right-handed user and in a lower right corner of the display area for a left-handed user of the drawing based application associated with an end of a range of a natural motion by the user; and
- controls arranged along the persistent arc shaped graphic visible and accessible at all times and located essentially in an arc in the graphic where the arc is substantially perpendicular to a natural motion path of the natural motion and the controls arranged along the persistent arc shaped graphic have an overlap interference angle of less than forty-five degrees, said controls comprising:
  - a tool control providing a menu for selecting a drawing tool of the application; and
  - a color control providing a menu for selecting paint color applied by a drawing tool of the application.

6. An interface as recited in claim 5, wherein said controls further comprise:
- a minimize control located on a side edge of the graphic and providing a minimize function for the interface;
- a page control located adjacent a bottom edge of the graphic and providing a page change function for drawing pages of the application;
- an edit control located adjacent to the page control and providing an undo function for the application; and
- a tool type control located between the tool control and the color control and providing a menu for selection a tool type of the application.

7. An interface as recited in claim 6, wherein the graphic comprises an arc shaped band.

8. An interface as recited in claim 6, wherein pop-up menus pop-up in association with the selected control and at a distance from side and bottom edges of the graphic to allow all menu commands to be displayed.

9. An graphical user interface for a tablet personal computer based drawing application using a stylus, comprising:
- an arc shaped persistent graphic located in a lower left corner of a display area of the drawing based application for a right-handed user and in a lower right corner of the display area of the drawing based application for a left-handed user and responsive to a natural motion by the user wherein the natural motion is a curve associated with movement of a hand of the user when an elbow of the user is pivoted and associated with an end of a range of the natural motion by a user; and
- controls arranged along the arc shaped persistent graphic visible and accessible at all times and located essentially in an arc in the graphic where the arc is substantially perpendicular to a natural motion path of the natural motion and activated by the stylus, wherein the controls arranged along the arc shaped persistent graphic have an overlap interference angle of less than forty-five degrees, said controls comprising:
  - a minimize control located on a side edge of the graphic and providing a minimize function for the interface;
  - a page control located adjacent a bottom edge of the graphic and providing a page change function for drawing pages of the application;
  - an undo control located adjacent to the page control and providing an undo function for the application;
  - a tool control located adjacent the minimize control and providing a menu for selecting a tool of the application;
  - a color control located adjacent the undo control and providing a menu for selecting paint color applied by a tool of the application; and
  - a tool type control located between the tool control and the color control and providing a menu for selection a tool type of the application,
- wherein a radius of the arc shaped curve is at least a radius of a menu of one of the controls,
- wherein a control closest to a display area is positioned along the curve at least a radius of a menu of the control from a display edge, and
- wherein a marking menu associated with one of the controls has a layout where a downward stroke brings up additional tool palettes and/or dialogs.

10. A method, comprising:
- mapping visible and accessible at all times controls of a persistent graphical user interface in an arc shape at a lower left corner location for a right-handed user and at a lower right corner location for a left-handed user and responsive to an approach arc associated with an end of a range of a natural user motion, with a radius responsive to an underlying menu activatable via one of the controls and where the arc starts near a first display edge and ends near a second display edge and arc is substantially perpendicular to a natural motion path of the natural motion, wherein the controls arranged along the persistent graphical user interface in the arc shape have an overlap interference angle of less than forty-five degrees; and
- allowing the user to activate the controls.

11. A method as recited in claim 10, wherein the mapping maps controls on the arc responsive to a function of the controls.

12. A method as recited in claim 10, wherein the allowing comprises:
- displaying a menu upon a touch input and allowing a user to select an item of the menu;
- displaying a menu and performing an interaction upon a dwell input; and
- performing a function upon a stroke input.

13. A method, comprising:
- mapping visible and accessible at all times controls of a graphical user interface in an arc shape at a lower left display corner location for a right-handed user and at a lower right display corner location for a left-handed user and responsive to an approach arc associated with an end of a range of a natural user motion, with a radius responsive to an underlying menu activatable via one of the controls and where the arc starts near a first display edge and ends near a second display edge and is substantially perpendicular to a natural motion path of the natural motion, wherein the controls arranged along the graphical user interface in the arc shape have an overlap interference angle of less than forty-five degrees; and
- allowing the user to activate the controls, wherein the location comprises a display area corner.

14. A method, comprising:
- mapping controls of an graphical user interface in an arc shape at a location responsive to an approach arc and with a radius responsive to an underlying menu activatable via one of the controls; and
- allowing a user to activate the controls, wherein the allowing comprises:
  - displaying a menu upon a touch input and allowing a user to select an item of the menu;
  - displaying a menu and performing an interaction upon a dwell input; and performing a function upon a stroke input, and wherein if a user is inking from a drawing canvas and the inking crosses into the menu, inking still occurs on the canvas.

15. A non-transitory computer readable storage for controlling a computer by mapping visible and accessible at all times controls of a persistent graphical user interface in an arc shape at a lower left corner location for a right-handed user and at a lower right corner location for a right-handed user and responsive to an approach arc associated with an end of a range of a natural user motion, where the arc shape starts near a first display edge and ends near a second display edge and is substantially perpendicular to a natural motion path of the natural motion and with a radius responsive to an underlying menu activatable via one of the controls and allowing the user to activate the controls, wherein the controls arranged along the persistent graphical user interface in the arc shape have an overlap interference angle of less than forty-five degrees.

16. An apparatus, comprising:
a display; and
a processor positioning a persistent graphical user interface of multiple controls visible and accessible at all times in a lower left corner of the display for a right-handed user and a lower right corner of the display for a left-handed user and associated with an end of a range of a natural user motion, the interface having an interface arc shape where the arc shape starts near a first display edge and ends near a second display edge and is substantially perpendicular to a natural motion path of the natural motion and positioning the controls on the interface arc at positions responsive to a natural motion arc of the user when moving a hand from a center of the display toward the corner, wherein the controls positioned along the interface arc have an overlap interference angle of less than forty-five degrees.

17. An apparatus as recited in claim 16, wherein the processor positions the controls responsive to a function of the controls.

18. An apparatus as recited in claim 16, further comprising a stylus-based input system coupled to the processor and the display, and activating the controls responsive to a tap of a stylus on one of the controls, a dwell of the stylus over one of the controls and a stroke of the stylus on one of the controls.

19. An interface, comprising:
a fixed position, arc shaped, display edge intersecting menu bar interface graphic located in a lower left display corner for a right-handed user and in a lower right display corner for a left-handed user and responsive to a natural motion by the user associated with an end of a range of the natural motion where the arc shaped graphic is substantially perpendicular to a natural motion path of the natural motion and starts near a first display edge and ends near a second display edge; and
controls arranged along the interface graphic visible and accessible at all times, and accessible via the natural motion, wherein the controls arranged along the interface graphic have an overlap interference angle of less than forty-five degrees.

20. An interface, comprising:
a first graphical user interface located in a lower left display corner and responsive to a first natural motion by a user associated with a first end of a range of the first natural motion; and
second graphical user interface located in a lower right display corner responsive to a second natural motion by the user associated with a second end of the range of the second natural motion; and
said first and second graphical user interfaces each comprising:
an arc shaped persistent graphic defining the interface area where the arc starts near a first display edge and ends near a second display edge and is substantially perpendicular to a natural motion path of the first and second natural motion; and
controls arranged along the arc shaped persistent graphic initiating an action, located in the interface area and visible and accessible at all times and accessible via the first and second natural motion.

21. An interface, comprising:
a graphical user interface area located in a lower left display corner for a right-handed user and in a lower right display corner for a left-handed user and responsive to a natural motion by the user associated with an end of a range of the natural motion and, comprising:
an arc shaped persistent graphic starting near a first display edge and ending near a second display edge and defining the interface area where the arc is substantially perpendicular to a natural motion path of the natural motion; and
controls arranged along the arc shaped persistent graphic initiating an action, located in the interface area and visible and accessible at all times and accessible via the natural motion, wherein the controls arranged along the arc shaped persistent graphic have an overlap interference angle of less than forty-five degrees.

22. An interface, comprising:
a graphical user interface area located in a lower left display corner for a right-handed user and in a lower right display corner for a left-handed user responsive to a natural motion by the user associated with an end of a range of the natural motion and, comprising:
an arc shaped persistent graphic starting near a first display edge and ending near a second display edge and defining the interface area where the arc is substantially perpendicular to a natural motion path of the natural motion; and
controls initiating an action, located in the interface area, all the controls arranged along the arc shaped persistent graphic visible and accessible at all times, and accessible via the natural motion,
wherein the controls arranged along the arc shaped persistent graphic have an overlap interference angle of less than forty-five degrees.

23. An interface as recited in claim 22, wherein the natural motion is a curve associated with movement of a hand of the user when an elbow of the user is pivoted.

24. An interface as recited in claim 23, wherein a location responsive to the natural motion of the user hand is defined by the natural motion passing through a substantial center area of a display area.

25. An interface as recited in claim 22, wherein the natural motion is a curve associated with movement of a hand of the user when an elbow of the user is pivoted and one of a wrist of the user is rotated and fingers of the user are moved.

26. An interface as recited in claim 22, wherein the graphic is a shape corresponding to an arc shaped curve and the controls are positioned in accordance with the curve.

27. An interface as recited in claim 26, wherein a radius of the arc shaped curve is at least a radius of a menu of one of the controls.

28. An interface as recited in claim 26, wherein a control closest to a display area is positioned along the curve at least a radius of a menu of the control from a display edge.

29. An interface as recited in claim 22, wherein a menu associated with one of the controls has a layout responsive to the curve.

30. An interface as recited in claim 22, wherein a marking menu associated with one of the controls has a layout where a downward stroke brings up additional tool palettes and/or dialogs.

31. An interface as recited in claim 22, wherein the interface is located in a lower left corner of a display area and the controls of the interface are arranged as one of a convex arc across the corner, a concave arc across the corner, a convex corner across the corner, a convex arc with a linear portion across the corner, a sectioned pie in the corner, and a sectioned pie in the corner and extending across the display area.

* * * * *

UNITED STATES PATENT AND TRADEMARK OFFICE
CERTIFICATE OF CORRECTION

| | | |
|---|---|---|
| PATENT NO. | : 7,898,529 B2 | |
| APPLICATION NO. | : 10/748686 | |
| DATED | : March 1, 2011 | |
| INVENTOR(S) | : George Fitzmaurice et al. | |

It is certified that error appears in the above-identified patent and that said Letters Patent is hereby corrected as shown below:

Column 1, Line 14 delete "10/748 685," and insert -- 10/748,685, --.

Column 2, Line 45 delete "the-present" and insert -- the present --, therefor.

Column 11, Line 37 in Claim 9, delete "An" and insert -- A --, therefor.

Column 12, Line 57 in Claim 14, delete "an graphical" and insert -- a graphical --, therefor.

Signed and Sealed this
Fifth Day of July, 2011

David J. Kappos
*Director of the United States Patent and Trademark Office*